US012810229B2

(12) United States Patent
Sinto

(10) Patent No.: US 12,810,229 B2
(45) Date of Patent: Nov. 24, 2026

(54) PRODUCTION MANAGEMENT SYSTEM, PRODUCTION MANAGEMENT METHOD, AND PROGRAM

(71) Applicant: NISSHO ELEKTRON CO.,LTD., Osaka (JP)

(72) Inventor: Shohei Sinto, Osaka (JP)

(73) Assignee: NISSHO ELEKTRON CO., LTD., Osaka (JP)

( * ) Notice: Subject to any disclaimer, the term of this patent is extended or adjusted under 35 U.S.C. 154(b) by 0 days.

(21) Appl. No.: 18/873,152

(22) PCT Filed: Jul. 26, 2023

(86) PCT No.: PCT/JP2023/027422

§ 371 (c)(1),
(2) Date: Dec. 9, 2024

(87) PCT Pub. No.: WO2024/105938

PCT Pub. Date: May 23, 2024

(65) Prior Publication Data

US 2025/0173662 A1 May 29, 2025

(30) Foreign Application Priority Data

Nov. 15, 2022 (JP) ................................ 2022-182604

(51) Int. Cl.
*G06Q 10/0639* (2023.01)

(52) U.S. Cl.
CPC ................................ *G06Q 10/0639* (2013.01)

(58) Field of Classification Search
CPC .................................................. G06Q 10/0639
See application file for complete search history.

(56) References Cited

U.S. PATENT DOCUMENTS

2009/0063238 A1* 3/2009 Storzum .......... G06Q 10/06398 705/7.42
2013/0050199 A1* 2/2013 Chavez ................ G06Q 10/101 345/419

(Continued)

FOREIGN PATENT DOCUMENTS

JP 2012-174019 A 9/2012
JP 2014-081852 A 5/2014
JP 7339705 B1 9/2023

OTHER PUBLICATIONS

International Search Report issued in PCT/JP2023/027422; mailed Oct. 10, 2023.

(Continued)

*Primary Examiner* — Deirdre D Hatcher
(74) *Attorney, Agent, or Firm* — Studebaker Brackett PLLC

(57) ABSTRACT

The present invention is capable of increasing the motivation of a worker who repeatedly performs the same task. This production management system comprises: a reception unit 11 that receives the fact that a task by a worker has been completed; a counting unit 12 that counts the number of completed tasks received by the reception unit 11; a calculation unit 13 that obtains acquired points by multiplying a numerical value, obtained by the counting of the counting unit 12, by a factor that has been set in accordance with the worker; and a display unit 15 that displays, on a display device 18, an avatar that changes in accordance with the acquired points.

9 Claims, 10 Drawing Sheets

(56) References Cited

U.S. PATENT DOCUMENTS

| | | | | |
|---|---|---|---|---|
| 2014/0278638 | A1* | 9/2014 | Kreuzkamp | G06Q 10/06398 705/7.15 |
| 2017/0278412 | A1* | 9/2017 | Marin | A63F 13/65 |
| 2019/0108747 | A1* | 4/2019 | Stenning | G08B 21/187 |
| 2021/0065895 | A1* | 3/2021 | Rones | G16H 10/20 |

OTHER PUBLICATIONS

Written Opinion issued in PCT/JP2023/027422; mailed Oct. 10, 2023.

"Decision to Grant a Patent" Office Action issued in JP 2022-182604; mailed by the Japanese Patent Office on Jun. 20, 2023.

"Notice of Reasons for Refusal" Office Action issued in JP 2022-182604; mailed by the Japanese Patent Office on Feb. 21, 2023.

"Labor management solution for warehouse workers launched in Japan;" Manhattan Associates, Inc.; Dec 22, 2021; pp. 1-3.

Yaguchi, Ryutaro; "Appealing to the user's psychology to encourage input;" Nikkei Systems; May 2013; pp. 66-71 and 111.

"Technology and Verification of Gamification Application in the Business Field;" NTT Technology Journal; Apr. 2015; pp. 42-45.

Kuwashima, Hirotoshi; "Games make work fun: Amazon, NPOs, and more are adopting them;" Jun. 25, 2022; pp. 1-3; [Online] https://www.sankei.com/article/20220625-ODR5XLIQEZKE7H6QQS7URTFTRA/.

Fukada, Koji; "Comprehensive Guide to Gamification: 1st edition," Feb. 20, 2012; pp. 79-99, 123-153, 211-230, Softbank Creative Corp.

* cited by examiner

FIG. 2

| Level | Required Point Number | Title | Comment |
|---|---|---|---|
| 1 | 0 | Pawn | It's just beginning! Work hard! |
| 2 | 10 | Lance | Still at beginner level |
| 3 | 20 | Knight | Getting a little used to it |
| 4 | 30 | Silver General | Improve from here! |
| 5 | 40 | Gold General | Getting better |
| 6 | 50 | Bishop | Very close to the goal! |
| 7 | 60 | Rook | The goal achieved!! |
| 8 | 70 | King | Record is growing! |
| 9 | 80 | God | This is legendary!! |
| 10 | 100 | Legend | |

FIG. 10

| Report ID | Report No | Department ID | Position ID | Employee ID | Level | EXP | Production Result | Acquisition Point | Creation time | Update Time | Employee Name | Target Number | Handicap (physical) | Cleared Point Threshold | Title | Comment | Handicap (location) |
|---|---|---|---|---|---|---|---|---|---|---|---|---|---|---|---|---|---|
| 2022-9-7-A1-3 | 1 | A1 | A1-3 | 3 | 2 | 1 | 12 | 11 | 2022/9/7 22:23 | 2022/9/11 2:18 | Tatsuya Okamoto | 3000 | 1 | 10 | Lance | Still at beginner level | 1.3 |
| 2022-9-7-A1-4 | 2 | A1 | A1-4 | 2 | 1 | 1 | 6 | 6 | 2022/9/7 22:23 | 2022/9/7 22:23 | Yohei Maruyama | 2000 | 2 | 0 | Pawn | It's just beginning! Work hard! | 1.4 |
| 2022-9-7-A1-1 | 3 | A1 | A1-1 | 1 | 3 | 1 | 20 | 20 | 2022/9/7 22:23 | 2022/9/7 22:23 | Shohei Shinto | 1000 | 1 | 20 | Knight | Getting a little used to it | 1 |
| 2022-9-7-A1-2 | 4 | A1 | A1-2 | 2 | 5 | 1 | 20 | 40 | 2022/9/7 22:23 | 2022/9/7 22:23 | Yohei Maruyama | 2000 | 2 | 40 | Gold General | Getting better | 1.2 |
| 2022-9-8-A1-1 | 5 | A1 | A1-1 | 1 | 9 | 1 | 81 | 81 | 2022/9/8 7:38 | 2022/9/8 7:38 | Shohei Shinto | 1000 | 1 | 80 | God | This is legendary!! | 1 |
| 2022-9-8-A1-2 | 6 | A1 | A1-2 | 2 | 1 | 1 | 3 | 6 | 2022/9/8 7:38 | 2022/9/8 7:38 | Yohei Maruyama | 2000 | 2 | 0 | Pawn | It's just beginning! Work hard! | 1.2 |
| 2022-9-8-A1-4 | 7 | A1 | A1-4 | 4 | 1 | 1 | 3 | 3 | 2022/9/8 7:38 | 2022/9/8 7:38 | Kiyoshi Nishikawa | 4000 | 1 | 0 | Pawn | It's just beginning! Work hard! | 1.4 |
| 2022-9-8-A1-3 | 8 | A1 | A1-3 | 3 | 1 | 1 | 3 | 3 | 2022/9/8 7:38 | 2022/9/8 7:38 | Tatsuya Okamoto | 3000 | 1 | 0 | Pawn | It's just beginning! Work hard! | 1.3 |
| 2022-9-10-A1-2 | 9 | A1 | A1-2 | 2 | 2 | 1 | 6 | 12 | 2022/9/10 10:51 | 2022/9/10 10:51 | Yohei Maruyama | 2000 | 2 | 10 | Lance | Still at beginner level | 1.2 |
| 2022-9-10-A1-4 | 10 | A1 | A1-4 | 4 | 1 | 1 | 3 | 3 | 2022/9/10 10:51 | 2022/9/10 10:51 | Kiyoshi Nishikawa | 4000 | 1 | 0 | Pawn | It's just beginning! Work hard! | 1.4 |
| 2022-9-10-A1-3 | 11 | A1 | A1-3 | 3 | 1 | 1 | 3 | 3 | 2022/9/10 10:51 | 2022/9/10 10:51 | Tatsuya Okamoto | 3000 | 1 | 0 | Pawn | It's just beginning! Work hard! | 1.3 |
| 2022-9-11-A1-2 | 12 | A1 | A1-2 | 2 | 2 | 1 | 5 | 12 | 2022/9/11 0:26 | 2022/9/11 0:26 | Yohei Maruyama | 2000 | 2 | 10 | Lance | Still at beginner level | 1.2 |

PRODUCTION MANAGEMENT SYSTEM, PRODUCTION MANAGEMENT METHOD, AND PROGRAM

TECHNICAL FIELD

The present invention relates to a production management system, a production management method, and a program.

BACKGROUND ART

There has been a production management system that displays production efficiency of a production line in an easy-to-understand manner and can manage the production line (see, for example, Patent literature 1). The production management system described in the Patent literature 1 calculates current actual result process numbers based on process completion information and outputs it to a monitor.

In the production management system, a progress status can be displayed on a monitor of an encapsulation machine installed at each production site. This makes it possible to prompt a worker operating the encapsulation machine to speed up a task pace if progress is falling behind a goal.

PRIOR ART LITERATURE

Patent Literature

Patent literature 1: JP2012-174019A

SUMMARY OF INVENTION

Problem to be Solved by Invention

By the way, the worker in the production line is required to perform the same tasks repeatedly, and those are simple tasks in many cases. In this case, there is a problem that the worker tends to easily lose motivation towards the tasks and easily break concentration.

In the production management system such as the Patent Document 1, the worker can be encouraged to speed up the task pace if the work is behind the goal, but this has little effect on increasing the motivation for the worker.

The present invention has been made in consideration of the above circumstances, and an object thereof is to provide a production management system, a production management method, and a program that are capable of increasing the motivation of the worker who repeatedly performs the same tasks.

Means for Solving the Problem

A production management system of one aspect according to the present invention includes a reception unit for receiving a completion of a task by a worker, a counting unit for counting completion numbers received by the reception unit, a calculation unit for obtaining an acquisition point by multiplying a coefficient set in accordance with the worker with respect to a numerical value counted by the counting unit, and a display unit for displaying an avatar, which is to be changed in accordance with the acquisition point, on a display device.

A production management method of one aspect according to the present invention includes a reception step of receiving a completion of a task by a worker, a counting step of counting completion numbers received by the reception step, a calculation step of obtaining an acquisition point by multiplying a coefficient set in accordance with the worker with respect to a numerical value counted by the counting step, and a display step of displaying an avatar, which is to be changed in accordance with the acquisition point, on a display device.

A program of one aspect according to the present invention is a program for causing at least one processor to execute each step of the above production management method.

Effect of the Invention

The production management system, the production management method, and the program of the above aspects according to the present invention each have an advantage that the motivation of the worker who repeatedly performs the same tasks can be increased.

BRIEF DESCRIPTION OF DRAWINGS

FIG. 2 A diagram of one example of a table which is to be used in a determination with a title determination unit according to the embodiment.

FIG. 10 A diagram of one example of a table regarding a status according to the embodiment.

DETAILED DESCRIPTION OF THE EMBODIMENT

Embodiment

Hereinafter, a production management system according to a present embodiment shall be explained in detail based on the attached drawings.

The production management system is a system which counts completion numbers of tasks performed by a worker, and changes an avatar 5 of the worker in accordance with a numerical value (hereinafter, an "acquisition point") obtained by multiplying a coefficient to the counted numerical value, and displays it on a display device 4.

According to the production management system, the worker can change the avatar 5 by completing the tasks, and therefore the worker can add elements that change the avatar 5 in addition to simply completing the tasks, and thus can increase motivation for the tasks. Moreover, since the coefficient corresponding to the worker can be set, a handicap can be set for the acquisition point, and thus the inequality in obtaining the acquisition points among multiple workers can be mitigated. For example, this can increase motivation and improve concentration on the tasks, even in the worker who only performs simple tasks, such as repeating simple tasks. As a result, in the worker, a task speed can be increase, and an increase in productivity can be expected.

In the following embodiment, a production management device 100 in which most of functions of the production management system are integrated into a single housing shall be described. However, it is not essential that the production management system has multiple functions integrated into the single housing, and, for example, constituent elements of the production management system may be distributed across multiple housings. Also, some of the functions of the production management system may be realized by Cloud (Cloud Computing), etc.

Figure 1:
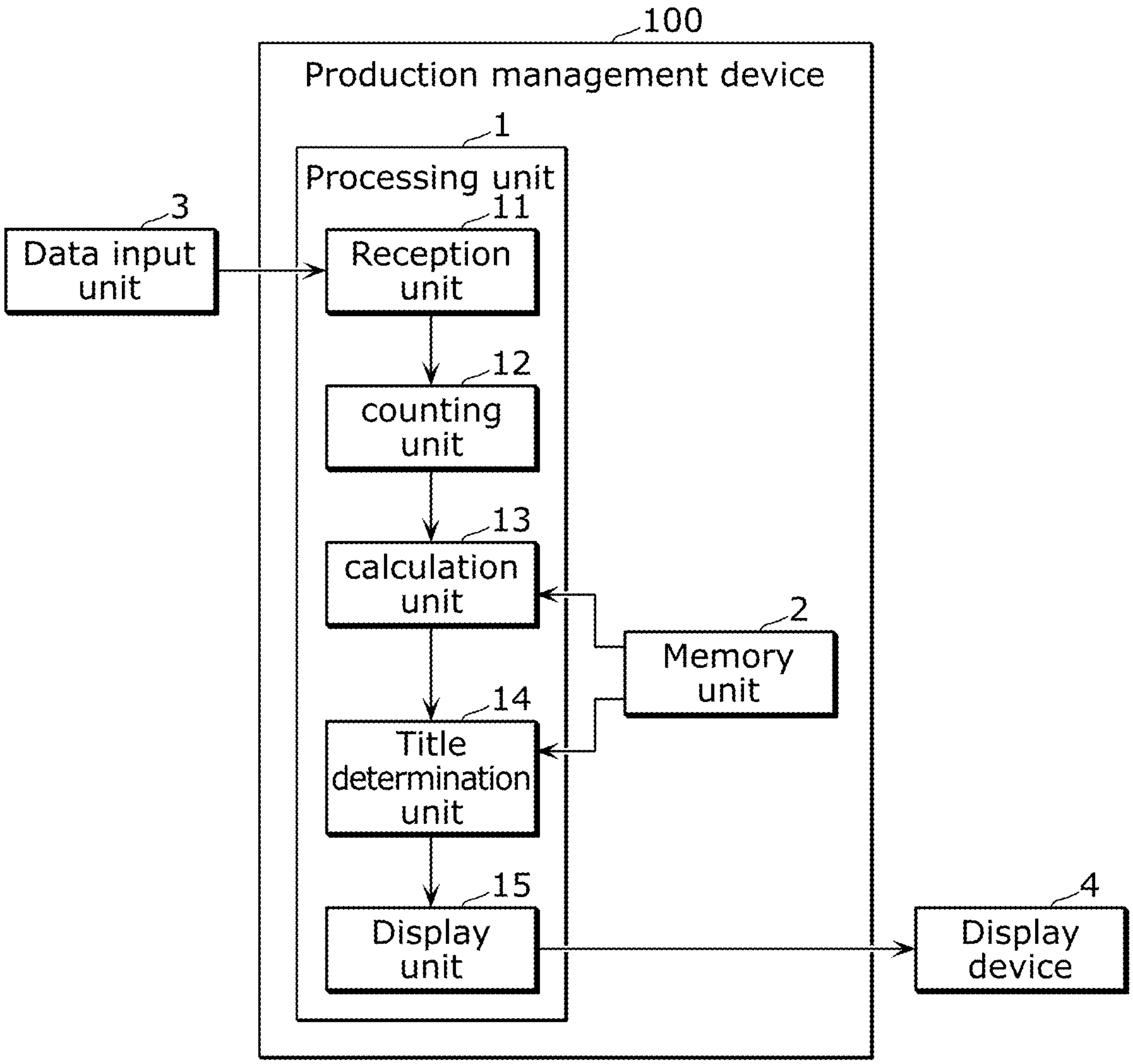
FIG. 1 A block diagram of a system including a production management device according to an embodiment of the present invention.

As shown in FIG. 1, an entire system including the production management device 100 has a data input unit 3, the production management device 100, and the display device 4. The data input unit 3, the production management device 100, and the display device 4 are connected via wires or wirelessly so as to be able to communicate with each other.

For example, the task performed by the worker is one process in a product production line. The task may be a task that the worker performs repeatedly, and, for example, a deliverable obtained by completing one task is placed on a conveyor belt system and handed over to a next worker. The deliverable obtained by completing one task may be one or multiple. In the present specification, the "task" is not limited to the task along the production line, but may also be, for example, a task of collecting the deliverable obtained by completing one task in a storage box. In other words, the "task" only needs to be able to count the completion of one task.

(Data Input Unit 3)

The data input unit 3 inputs the completion number of the task which is performed by the worker into the system. The data input unit 3 according to the present embodiment detects the deliverable obtained by completing the task and inputs the completion number of "1" into the production management device 100. For example, the data input unit 3 can be a sensor attached to the conveyor belt system. For example, a non-contact sensor such as a photoelectric sensor installed so as to intersect a transport direction of the conveyor belt system, a contact sensor such as a pressure-sensitive sensor, a camera, an infrared sensor, a laser sensor, and various displacement sensors, etc., are exemplified as the sensor. Also, the data input unit 3 may be a count with object recognition in a camera image.

The data input unit 3 is not limited to the one that inputs the completion number of "1" when the single deliverable is detected by the sensor. For example, in a case in which a plurality of the deliverables are to be produced in one task, the completion number of "1" may be input when all of the deliverables are detected. Also, for example, in a case of the task of "cutting a vegetable", the cut vegetables are to be the deliverables, and the completion number of "1" may be input when the cut vegetables exceed a predetermined weight.

The data input unit 3 may determine a completion degree of the deliverable of the task, and may input the completion number of "1" with a determination that the task is completed. This also prevents a defective product from being input as the completion number. The determination of the completion degree may be automatically determined by a function of the system, or may be determined by a worker in a next process in the production line. The defective product may be processed so as not to be input as the completion number, or the completion number including the defective product may be temporarily input, and then a process in which a number of the defective product is subtracted from a total number of the completion numbers may be performed.

The data input unit 3 may not be the one which automatically detects the completion number of the task with the sensor. For example, the data input unit 3 may be an input device to which the completion of the task is to be input by a worker, a manager, etc. For example, a mouse, a keyboard, a microphone, a touch panel, etc., are exemplified as the input device.

The data of the completion number input by the data input unit 3 is transmitted to the production management device 100 from the data input unit 3.

(Production Management Device 100)

The production management device 100 executes processes such as a graphic based on the completion number of the task transmitted from the data input unit 3, and displays on the display device 4. For example, the production management device 100 includes a personal computer or a server computer. That is, the production management device 100 includes a computer system having one or more processors and memory. At least a part of the functions of the production management device 100 are to be realized by the processor of the computer system executing programs stored in the memory of the computer system. The programs may be stored in the memory, or may be provided via a telecommunication line such as the Internet, or may be stored in a non-temporary storage medium such as a memory card and provided.

As shown in FIG. 1, the production management device 100 has a processing unit 1 that executes processes of the production management device 100, and a memory unit 2. The processing unit 1 is to be realized by a processor that executes various processes according to programs stored in a storage. For example, a CPU (Central Processing Unit), an MPU (Micro Processing Unit), a GPU (Graphics Processing Unit), and a microprocessor, etc., are exemplified as the processor.

The memory unit 2 stores information dealt with the production management device 100. For example, the memory unit 2 is to be realized by a ROM (Read Only Memory), a RAM (Random Access Memory), an EEPROM (Electrically Erasable Programmable Read Only Memory), an HDD (Hard disk drive), an SSD (Solid State Drive), etc. It may also be a combination thereof.

The processing unit 1 has a reception unit 11, a counting unit 12, a calculation unit 13, a title determination unit 14, and a display unit 15. The reception unit 11, the counting unit 12, the calculation unit 13, the title determination unit 14, and the display unit 15 merely indicate functions to be realized by the production management device 100, and do not necessarily indicate tangible configurations.

The reception unit 11 receives the data of the completion number transmitted from the data input unit 3. When the data of the completion number of the task from the data input unit 3 is received, the reception unit 11 outputs information of the completion number to the counting unit 12 as information in which the worker and the completion number are associated. In a case in which there are a plurality of the workers, the reception unit 11 receives the data of the completion numbers compartmentalized for each of the workers and executes a process as information that associates with the worker and the completion number.

The counting unit 12 counts the completion numbers received by the reception unit 11. When the completion number of "1" of the task by the worker is input, the counting unit 12 counts the completion number as +1 (the counted numerical value will be sometimes called "counted value"). Also, when the completion numbers of the tasks resulting from performing the tasks for a fixed period are collectively input from the data input unit 3, two or more corresponding numerical values are to be counted. For example, when the completion numbers of "10" are input, the counting unit 12 counts the numerical value by "+10". The information of the counted value counted by the counting unit 12 is to be output to the calculation unit 13.

The calculation unit 13 calculates the acquisition point by multiplying the coefficient which is set in accordance with the worker with respect to the counted value input from the counting unit 12. The coefficient set in accordance with the worker is a setting value for mitigating a difference between the acquisition points. The coefficient is not particularly limited, but is preferably not less than 0.7 and not more than 2, more preferably not less than 0.8 to not more than 1.5, and even more preferably not less than 0.9 to not more than 1.3.

The coefficient is preferably set by those who grasp the plurality of workers. For example, a production line manager, a supervisor, or a president can be exemplified as an administrator of the plurality of workers. For example, physical handicap, age, task location, placement position, presence or absence of concurrent duties with other tasks, years of employment, job title, qualification, height, weight, gender, physical ability, etc., are exemplified as factors considered in the coefficient. For example, disabilities, low vision, hearing loss, etc., are exemplified as the physical handicap.

Also, the factor to be considered in the coefficient is not limited to one element, but may be set by multiplying multiple elements. For example, an index related to a location may be set as a first index, an index related to attributes of the worker may be set as a second index, and the coefficient may be calculated by multiplying the first index and the second index.

For example, the index related to the location is set by considering whether the task location is near a phone for the work, whether the task location is near a parts arrival location, whether there is an interrupt task on the work, whether the task environment is poor, whether the task is likely to be a task with a defective product or an inferior product, whether it is necessary to operate an operation panel of a machine separately from the task, whether the task is responsible for a recovery operation for machine failures and errors, whether job descriptions are special, whether a device to be used is excellent in an operability, whether a workability and a work efficiency corresponding to a product are good, etc.

For example, the index related to the attributes of the worker is set by taking into consideration years of experience, whether a workability due to height differences is good, whether the worker has a physical handicap, whether the worker has special skills and is required to take on additional responsibilities outside of the task at the same time.

Also, the coefficient may be set based on calories burned. For example, the index related to the location may be set as the first index, an index that takes into account the calories burned per one task may be set as a second index, and the coefficient may be calculated by multiplying the first index and the second index.

The coefficients are stored in the memory unit 2 in one-to-one correspondences with the plurality of workers. Also, in a case in which the worker belongs to some department in a company, the memory unit 2 stores not only the coefficient but also the department to which the worker belongs in association with the worker.

When the information of the counted value is input from the counting unit 12, the calculation unit 13 refers to a worker name (including an ID corresponding to the worker) and obtains the coefficient corresponding to the worker from the memory unit 2. Then, the calculation unit 13 multiplies the coefficient with respect to the counted value and calculates the acquisition point. The calculation unit 13 outputs the information of the acquisition point obtained by calculating to the title determination unit 14.

The title determination unit 14 determines a title based on the acquisition point and assigns the title to the worker. A determination table to be used when making a title determination is stored in the memory unit 2. As shown in FIG. 2, in the determination table, a required point served as a threshold value of the acquisition point is associated with the title and a level. The title determination unit 14 refers to the determination table and determines the title based on the acquisition point. For example, in a case in which the acquisition point is "25", the title determination unit 14 determines "Knight", the required point of which is not less than "20", as the title of the worker. After the determination, the title determination unit 14 assigns the determined title and level to the worker name. Information relating to the title assigned to the worker name is to be output to the display unit 15.

As a matter of course, as shown in FIG. 2, Pawn, Lance, Knight, Silver General, Gold General, Bishop, Rook, King, God, and Legend are listed as the title, but those are merely examples and there are no particular restrictions.

The display unit 15 changes the avatar 5 of the corresponding worker according to the title determined by the title determination unit 14, and displays it on the display device 4. In other words, the display unit 15 displays the avatar 5, which is to be changed according to the acquisition point, on the display device 4.

The avatar 5 is set for each worker. For example, a person, an animal, a character resembling the worker, a plant, a machine, a fantasy character (for example, a dragon, a unicorn, etc.), etc., are exemplified as the avatar 5. Regarding the avatar 5 that the display unit 15 displays, the worker may select the desired avatar 5, or all the workers may be set to the same character. Also, the avatar 5 may be the one that independently obtained by the worker, and may be imported into the system using a USB memory, etc.

The change in the avatar 5 means a change in a graphic. For example, a posture change, a motion change, a change in clothing or wearing items, a physical change, a vehicle change, a color change, etc., are exemplified as examples of the change in the avatar 5. For example, the posture change includes changing the posture to a sitting posture, a crouching posture, a standing posture, etc. For example, the motion change includes changing the motion such as walking, running, jumping, flying, swimming, dancing, laughing, crying, and sleeping. For example, the wearing items include a crown, a medal, a badge, a weapon, an armor, a mask, a capes, etc. For example, the physical change includes an increase in muscle mass, a hair color change, an increase in height, an appearance change among conceptually same kind things (for example, dog→horse→lion), etc. The vehicle change includes changing the vehicle to be ridden by the avatar 5. For example, for the vehicle, a change in types such as a tricycle, a bicycle, a motorcycle, a car, an airplane, etc., and a change within a single type (light car→regular car→luxury car) are exemplified.

The display unit 15 according to the present embodiment changes the avatar 5 according to the title determined by the title determination unit 14, but, for example, not limited to the determination of the title, may change the avatar 5 when the acquisition point exceeds a fixed numerical value. For example, when the acquisition point reaches a well-delimited value such as 100 points, the motion change may be performed. Also, the avatar 5 may be gradually changed as the acquisition point increases by 1 point.

Figure 4:
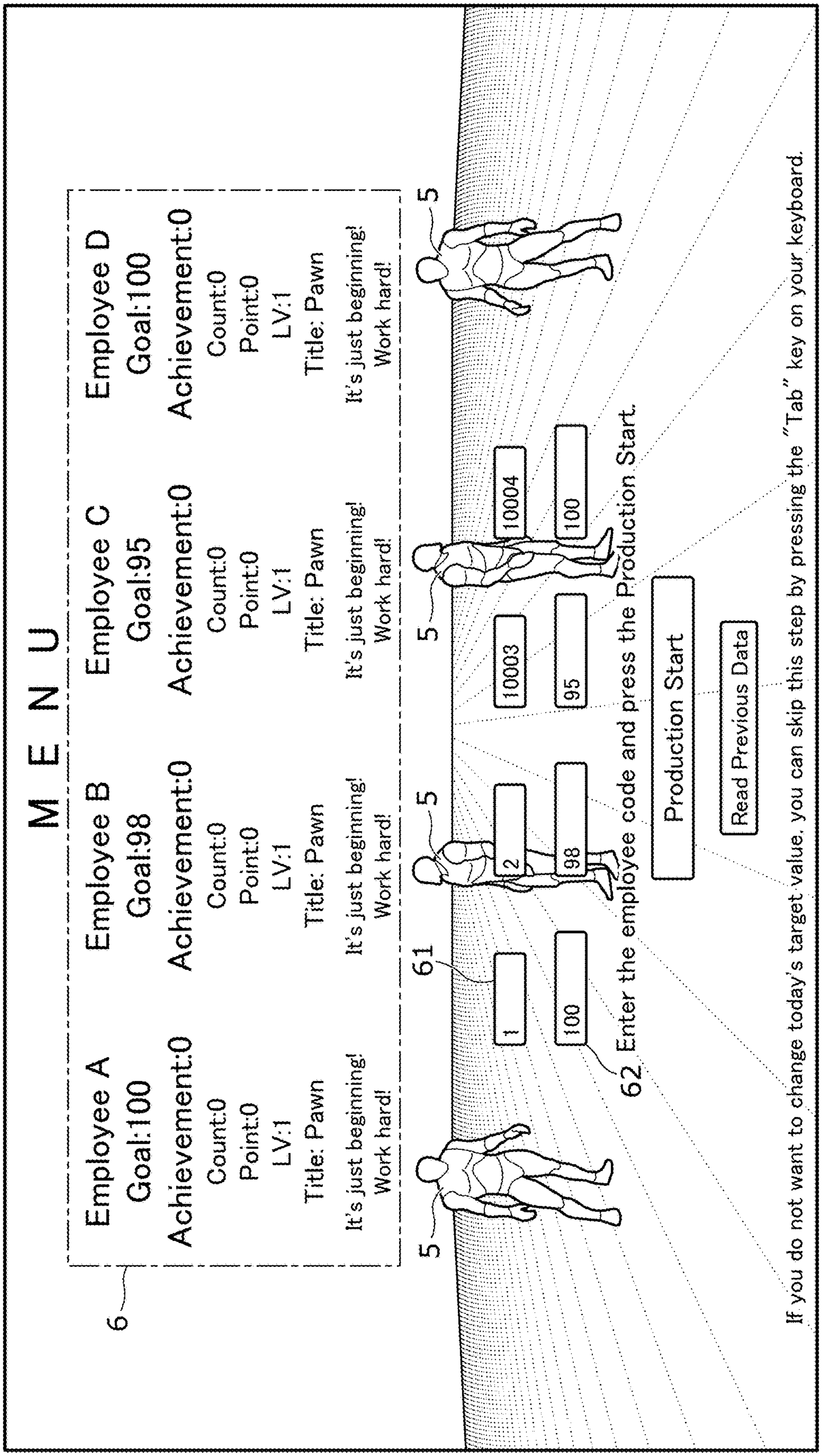
FIG. 4 A schematic image diagram showing one example of a display screen of a display device according to the embodiment.
Figure 7:
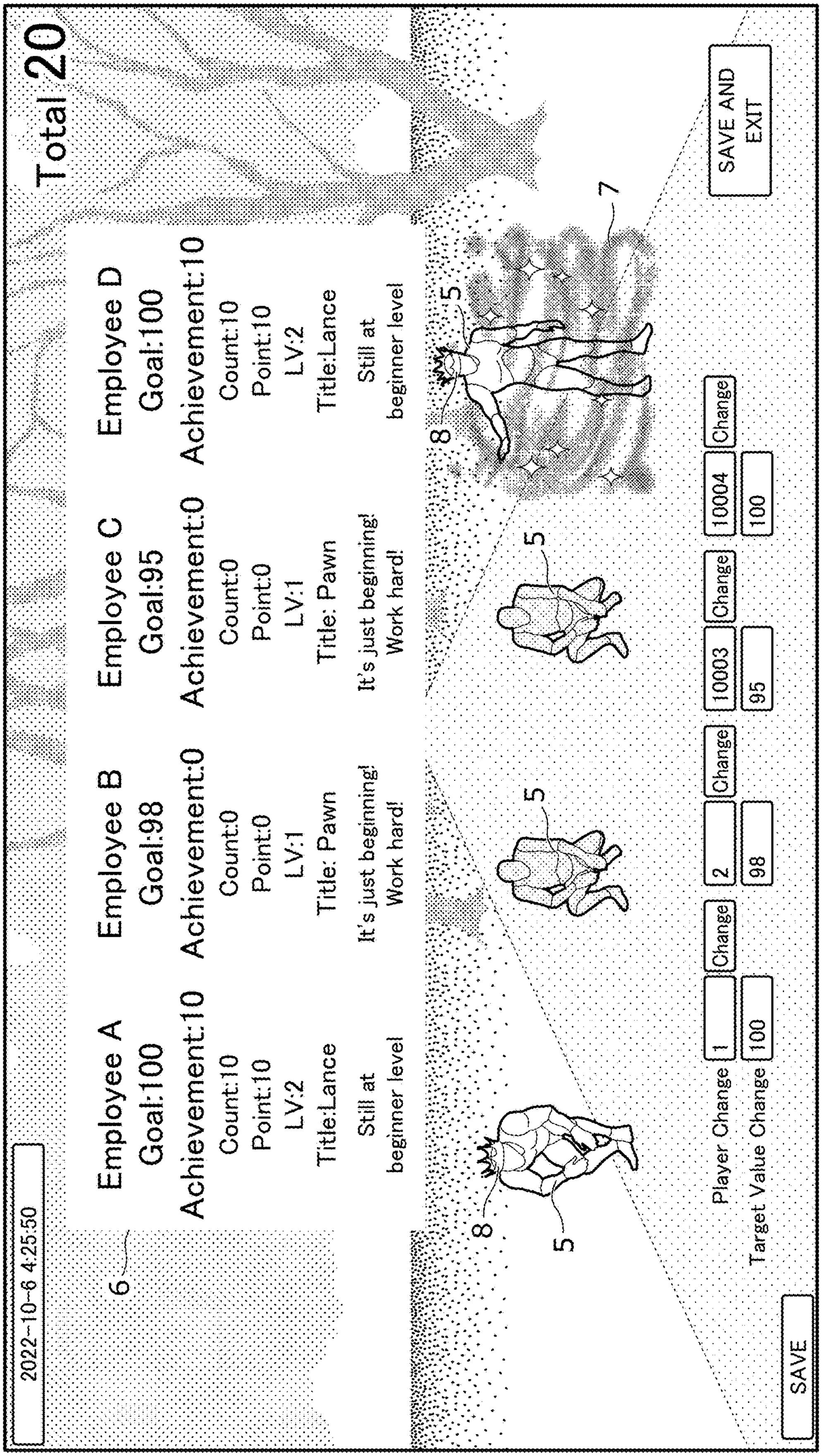
FIG. 7 A schematic image diagram showing one example of the display screen of the display device according to the embodiment.

As shown in FIG. 4, etc., the display unit 15 preferably displays a plurality of avatars 5 on a single display screen. The multiple avatars 5 are to be assigned different workers, respectively. Also, as shown in FIG. 7, etc., the display unit 15 preferably attaches the wearing item such as the crown 8 to the avatar 5, which has the highest acquisition point at a certain time. By configuring it this manner, the worker can see not only the change in his or her own avatar 5, but also the changes in the avatars 5 of other workers, and it is therefore possible to stimulate a competitive spirit. As a result, motivation for the task can be improved and the task speed can be increased.

Also, as shown in FIG. 7, etc., the display unit 15 may display a total numerical value obtained by adding up the counted values of the plurality of workers. For example, the display unit 15 displays "Total" on an upper right corner of the screen, and displays the total numerical value of the counted values of the plurality of workers adjacent to it. For example, by displaying the plurality of workers who belong to the same department on the single display screen, the total counted value for each department can be displayed. The total counted value of the department can be said to be the department proficiency in the task, and therefore the production line manager, etc., can consider the placements of the workers on the production line with reference to the total counted value of the department. Also, the total value of the counted values of each department may be imported into a BI (Business Intelligence) tool and may be displayed as a graph.

(Display Device 4)

In the display device 4, the display screen is controlled by the display unit 15 of the production management device 100. The display screen of the display device 4 is displayed based on the information about the avatar 5 output from the display unit 15. The display device 4 may be a large display installed in a location where the plurality of workers can constantly see it, or may be a small display installed at each task location of the worker. Also, a terminal owned by each worker may be used as the display device 4. For example, a monitor, a display, a touch display, a projector, a smartphone, a tablet device, a notebook PC, a VR goggle, a head-mounted display, etc., are exemplified as the display device 4.

(Flowchart)

Next, an operation example of the production management device 100 according to the present embodiment shall be explained based on the flowchart.

A production management method using the production management device 100 (sometimes referred to as the "production management method") sequentially executes a preparation step (ST1), a reception step (ST2, 3), a counting step (ST4), a calculation step (ST5), a display step (ST6, 7, 8), and a storage step (ST9).

In the preparation step, a preparation of the production management device 100 is executed. In the preparation step, initial settings are performed, and a registration of the worker, a target value corresponding to the worker, etc., are to be set (ST1).

In FIG. 4, one example of a screen for performing the initial settings (hereinafter, the setting screen) is shown. The setting screen has a status area 6 that displays a status, an area where the plurality of avatars 5 are lined up, and a plurality of input boxes 61 and 62 corresponding to each avatar 5. The multiple avatars 5 correspond to task locations in a task line. In FIG. 4, in a case in which the task locations are provided in the order of a first task location, a second task location, a third task location, and a fourth task location along the task line, a case where an "employee A" is placed in the first task location, an "employee B" is placed in the second task location, an "employee C" is placed in the third task location, and an "employee D" is placed in the fourth task location is shown. In the input boxes 61 and 62, an employee number is to be input to the input box 61 on an upper side, and the target value of the worker is to be input to the input box 62 on a lower side. When the employee number is input to the input box 61 on the upper side, the worker name assigned to the employee number is to be read from the memory unit 2 and displayed (it is displayed as the "employee A", the "employee B", etc., in the diagram example).

Figure 3:
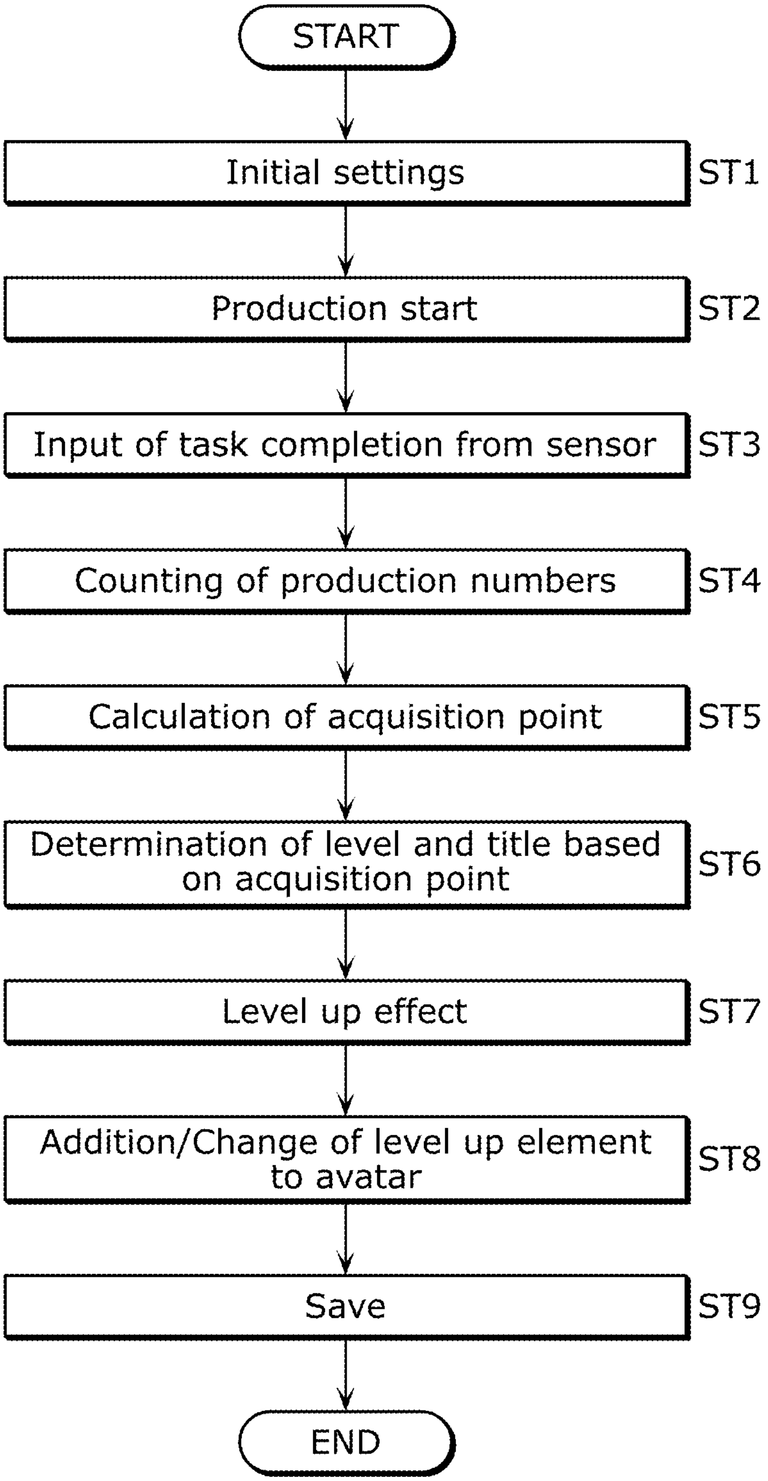
FIG. 3 A flowchart showing one example of an operation of the production management device according to the embodiment.

In the status area 6, "Target Value", "Achievement", "Count", "Point", "Lv (hereinafter, Level)", "Title", and "Comment" are to be displayed. The target value is linked to the input box 62 on the lower side, and reflects a numerical value entered in the input box 62 on the lower side. In the "Achievement", the total value of the completion numbers of the tasks (the counted value) in the corresponding task location is to be displayed. For example, in one task location, the first and second workers may be switched depending on the time of day. In this case, a total of the counted value of the first worker and the counted value of the second worker is to be displayed in the "Achievement". In the "Count", the completion numbers of the tasks (the counted value) are to be displayed. In the "Point", the acquisition point of the worker is to be displayed. In the level, the level value corresponding to the acquisition point of the worker is to be displayed. In the "Title", the title corresponding to the acquisition point of the worker is to be displayed. As shown in FIG. 3, in the "Comment", a comment associated with the title is to be displayed in the table.

Figure 5:
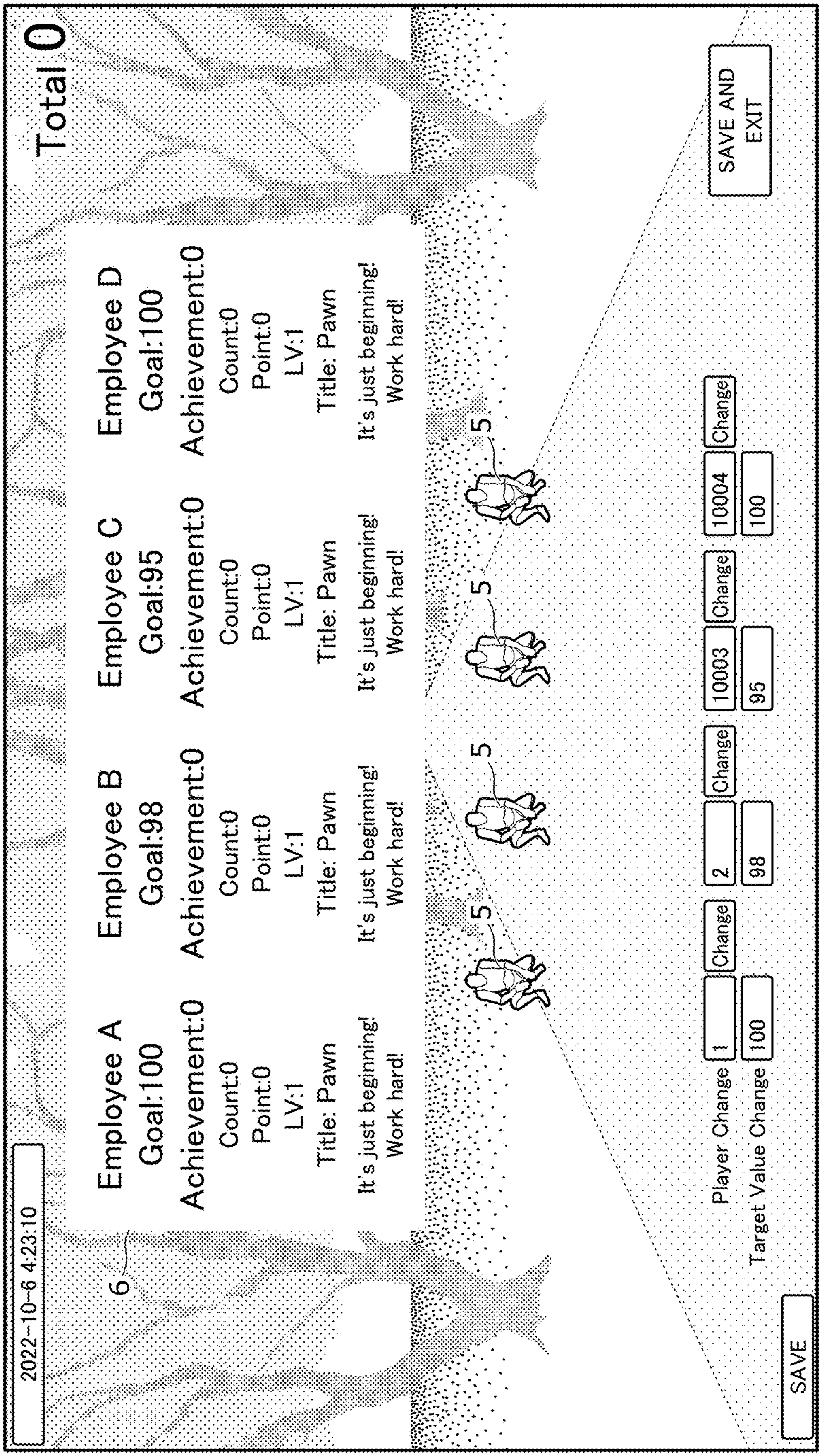
FIG. 5 A schematic image diagram showing one example of the display screen of the display device according to the embodiment.

The preparation step is to be completed when various settings for the workers are completed and a "Start Production" button is pressed on the setting screen. The screen at that time is shown in FIG. 5. In the initial settings, the acquisition point is set to zero, and therefore each avatar 5 is set to the crouching posture. In a case in which contents of a previous task are to be carried over, status at the end of the previous task is to be automatically input by pressing the "Read Previous Data" button.

In the reception step, the completion of the task by the worker is received, after the production is started (ST2, 3). When the worker completes one task, the data of the completion number is input into the reception unit 11 from the data input unit 3.

Next, the counting step for counting the completion numbers is executed. In the counting step, the completion numbers of the tasks received in the reception step are to be counted, and the counted value is to be obtained. As described above, the counted value is to be reflected in the "Achievement" and the "Count" in the status area 6.

Next, the calculation step for calculating the acquisition point based on the counted value is executed (ST5). In the calculation step, the acquisition point is to be calculated by multiplying the coefficient with respect to the counted value. The acquisition point is to be reflected in the "Point" in the status area 6.

Next, the display step is executed. In the display step, the table shown in FIG. 2 is referenced, and the level and the title are determined based on the acquisition point. Then, the "Title" and the "Level" in the status area 6 are to be updated based on the determined level and title.

Figure 6:
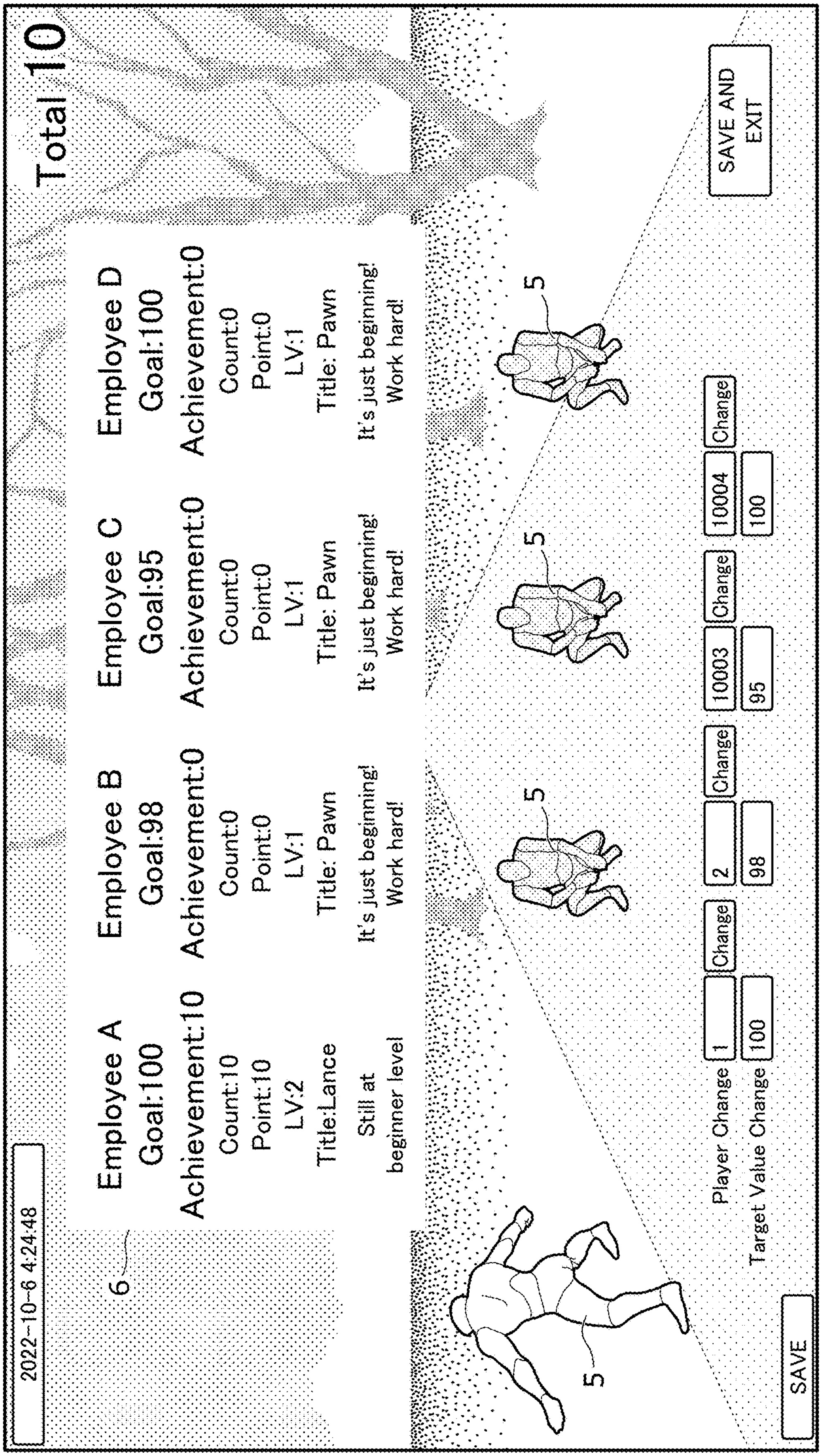
FIG. 6 A schematic image diagram showing one example of the display screen of the display device according to the embodiment.

At this time, when the level rises, a level-up effect is to be processed (ST7, 8). As shown in FIG. 6, a rotation of the avatar 5 is exemplified as the level-up effect in the present embodiment (see the avatar of the employee A). Also, for example, as shown in FIG. 7, a glittering graphic display 7 may be processed as the level-up effect (see the avatar of the employee D). Also, the crown 8 is to be worn by the avatar 5 with the highest "Count" (the counted value) at the certain time.

Figure 8:
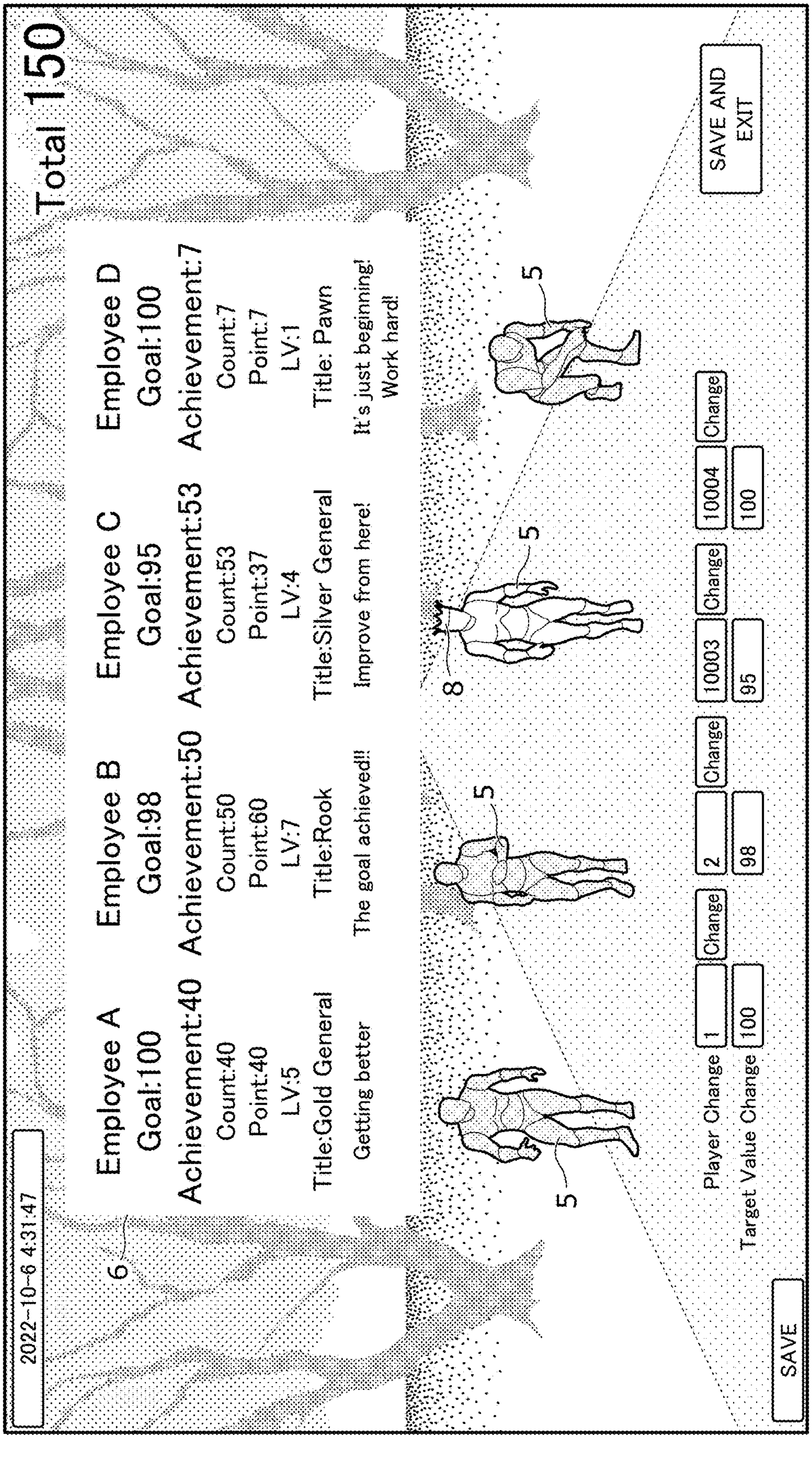
FIG. 8 A schematic image diagram showing one example of the display screen of the display device according to the embodiment.

The display screen when the task has progressed is shown in FIG. 8. As shown in FIG. 8, as the level rises, the posture of the avatar 5 changes from the crouching posture. Here, the employee D is at the level "1", the title "Pawn", and therefore the avatar 5 is set to the crouching posture. On the other hand, the employee C is at the level "4", the title "Silver General", and therefore the avatar 5 changed to the walking posture. Also, in the employee C, the "Count" (the counted value) is the highest at "53", but the "Point" (the acquisition point) calculated by multiplying the coefficient with respect to the counted value is smaller than that of the employee B. Specifically, the coefficient of the employee B is set to 1.2, and the coefficient of the employee C is set to 0.7.

Figure 9:
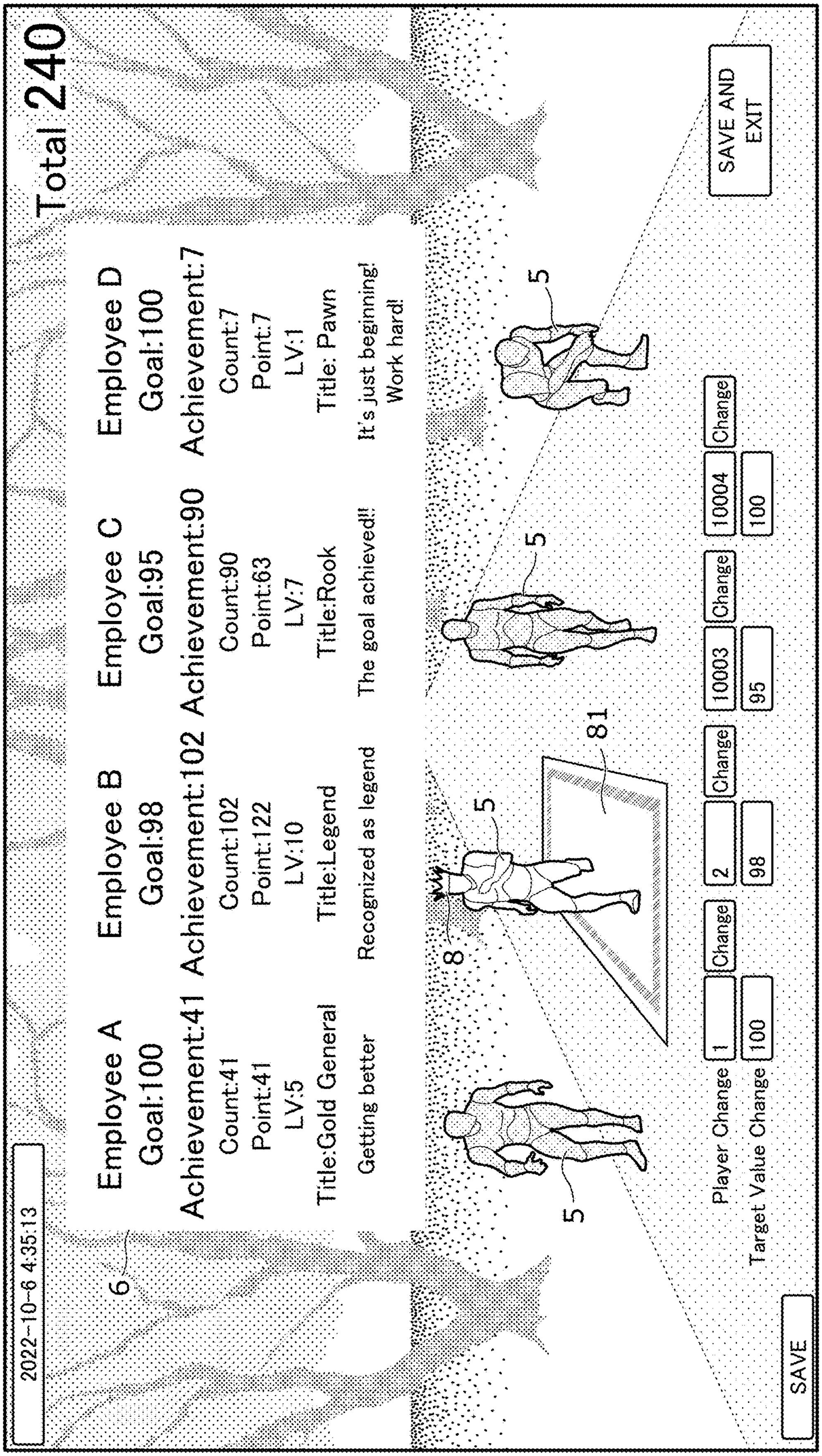
FIG. 9 A schematic image diagram showing one example of the display screen of the display device according to the embodiment.

Next, the display screen when the task has further progressed is shown in FIG. 9. As shown in FIG. 9, the "Point" (the acquisition point) of the employee B has been achieved the goal, and therefore the carpet has been laid under the avatar 5. Furthermore, the employee B is at the level "10", the title "Legend", and therefore the posture has changed to that of a full-speed sprint.

The processes from the ST3 to the ST9 are to be executed instantly, and when a user presses the "SAVE AND EXIT" button, the status of the worker at that time is saved in the memory unit 2. Also, the status at the exit time can be carried over by loading the stored status in the initial settings at the next startup (ST9).

The status stored here is to be saved as a database format, etc. The status stored here may be saved as a daily report in association with the date. Specifically, the status is to be saved as a data table. If an example of the data table stored in the memory unit 2 is shown, as shown in FIG. 10, a report ID, a report number, a department ID, a position ID, an employee ID, the level, an EXP (experience point), a production achievement, the acquisition point, a creation time, an update time, an employee name, the target value, the handicap (person), a cleared point threshold value, the title, the comment, the handicap (location), etc., are to be set as items of the table.

The acquisition point is stored in association with the employee name (the employee ID) and the department ID. For example, the department ID is associated with the department name in the department table. A handicap related to a person is to be set to the handicap (physical), and a handicap related to a location is to be set to the handicap (location).

(Modification example)

The above embodiment is merely one of various embodiments of the present invention. The embodiment can be modified in various manners depending on the design, etc., as long as the purpose of the present invention can be achieved. Hereinafter, the modification examples of the embodiment shall be listed. The modification examples to be described below can be applied in appropriate combinations.

In the above embodiment, the avatars 5 are lined up in a row on the display screen of the display device 4, but, for example, in a case in which the production line flows in a U-shape, the avatars 5 may be lined up in a U-shape to match the flow of the production line. In other words, the avatars 5 may be arranged to match the production line.

The production management method according to the above embodiment includes the preparation step, the reception step, the counting step, the calculation step, the display step, and the storage step, but the preparation step and the storage step may be omitted.

In the above embodiment, when the goal was achieved, the carpet was placed under the avatar 5, but, for example, a necklace may be worn by the avatar 5.

In the above embodiment, the crown 8 was worn by the avatar 5 with the highest "Count" (the counted value) at that the certain during the task, but the avatar 5 may be illuminated by a spotlight. Also, the wearing of the crown 8 and the illumination of the spotlight may be performed simultaneously. Also, the wearing of the crown 8 and/or the illumination of the spotlight may be performed to the avatar 5 with the highest acquisition point, rather than the avatar 5 with the highest "Count" (the counted value) at the certain time during the task.

The medal may be awarded to the avatar 5 who has updated the best in an increase value of the counted value, or the acquisition 10 point every fixed time from the start (for example, 1 hour). As a result, an improvement in the task speed of the worker can be expected.

In the above embodiment, the worker is assigned to the avatar 5 by inputting the employee number in the initial settings, but, for example, the worker name may be identified by the employee ID with 15 a built-in IC chip or RFID, a QR code (registered trademark), etc., instead of inputting the employee number, and this may be assigned to the avatar.

The acquired medal number, the acquired crowns number, etc., may be stored in the memory unit 2 so as to be output as a report 20 when evaluating the worker.

SUMMARY

As described above, the production management device 100 according to the first aspect has the reception unit 11 that receives the completion of the task by the worker, the counting unit 12 that 25 counts the completion numbers received by the reception unit 11, the calculation unit 13 that obtains the acquisition point by multiplying the coefficient set in accordance with the worker with respect to the numerical value counted by the counting unit 12, and the display unit 15 that displays the avatar 5, which is to be changed in accordance with the acquisition point, on the display device.

According to this aspect, the avatar 5 is to be changed in accordance with the acquisition point, and the worker thereby can perform the task using the change in the avatar 5 as motivation. Moreover, the acquisition point is the numerical value in which the coefficient set according to the worker is multiplied, and therefore the changeability of the avatar 5 can be adjusted, reducing the inequality between the workers. As a result, it is possible to increase the motivation of the worker who repeatedly performs the same tasks.

In the production management device 100 according to the second aspect, the reception unit 11 is capable of receiving the completion numbers of the tasks of the plurality of workers, the calculation unit 13 obtains the acquisition points for each of the workers, and the display unit 15 displays the plurality of avatars 5 on the single display device 4, in the first aspect.

According to this aspect, a competitive spirit can be imparted against another worker, and the motivation for the task can be further improved.

In the production management device 100 according to the third aspect, the display unit 15 displays the total numerical value obtained by adding up the counted values of the completion numbers by the plurality of workers on the display device 4, in the second aspect.

According to this aspect, the manager, etc., can consider the placements of the workers in the production line, etc., with a plurality of worker units, since the counted values of the completion numbers of the tasks can be displayed as the total value relating to the plurality of workers.

In the production management device 100 according to the fourth aspect, the display unit 15 changes the avatar 5, as the changes according to the acquisition point, when the acquisition point reaches the threshold value or more, in any one of the first to third aspects.

According to this aspect, the threshold value for changing the avatar 5 can be set, making it easier to control the motivation of the worker.

The production management method according to the fifth aspect includes the reception step of receiving the completion of the task by the worker, the counting step of counting the completion numbers received by the reception step, the calculation step of obtaining the acquisition point by multiplying the coefficient set in accordance with the worker with respect to the numerical value counted by the counting step, and the display step of displaying the avatar, which is to be changed in accordance with the acquisition point, on the display device.

According to this aspect, it is possible to increase the motivation of the worker who performs the same tasks repeatedly.

The program according to the sixth aspect is the program for causing at least one processor to execute each step of the production management method according to the fifth aspect.

According to this aspect, it is possible to provide the program with which the motivation of the worker who performs the same tasks repeatedly can be increased.

In the production management device 100 according to the seventh aspect, the acquisition point is stored in association with the employee name (the employee ID) and the department ID.

According to this aspect, an accumulated value that each employee has acquired so far can be managed for each manufacturing department. As a result, the manager, etc., can grasp proficiency and experience of each employee for each manufacturing department.

REFERENCE SIGNS LIST

100: Production management device (Production management system)
1: Processing unit
11: Reception unit
12: Counting unit
13: Calculation unit
14: Title determination unit
15: Display unit
2: Memory unit
3: Data input unit
4: Display device
5: Avatar

The invention claimed is:

1. A production management system comprising:
a computer system including at least one processor and a memory, the at least one processor being configured to execute:
a reception process of receiving, based on information acquired from a sensor that detects a deliverable indicating completion of a task performed by each worker among a plurality of workers arranged along a production line, a completion of the task;
a counting process of counting a completion number of the task performed by each worker received by the reception process;
a coefficient correction process of acquiring, from the memory, attribute information relating to each worker and environmental information relating to a work location of each worker, and generating a coefficient for each worker based on the attribute information and the environmental information;
a calculation process of obtaining an acquisition point for each worker by multiplying the counted completion number of the task performed by each worker and the coefficient for each worker; and
a display process of generating, and outputting to a single display device viewable by a manager of the plurality of workers arranged along the production line, a graphical user interface of the plurality of workers arranged along the production line in which respective avatars corresponding to the plurality of workers are simultaneously arranged in an arrangement that spatially corresponds to positions of the plurality of workers along the production line, each of the avatars being dynamically updated in real time as the counting process incrementally counts the completion number of the task and as the acquisition point for each worker changes,
wherein the display process includes applying to each of the avatars simultaneously displayed in the graphical user interface of the plurality of workers arranged along the production line a special visual effect or decoration based on a relative comparison of the acquisition points among the plurality of workers, and the graphical user interface of the plurality of workers arranged along the production line provides an operational status of the production line as a whole including a current progress and a relative performance state of each of the plurality of workers arranged along the production line.

2. The production management system according to claim 1, wherein the at least one processor is configured to calculate the current progress of the production line as a total value by summing the completion number for each worker among the plurality of workers, and to display the total value on the single display device.

3. The production management system according to claim 1, wherein the at least one processor is configured, in the display process, to determine whether the acquisition point of a worker is equal to or greater than a predetermined threshold, and to change a display content of the avatar in response to determining that the acquisition point of the worker is equal to or greater than the predetermined threshold.

4. The production management system according to claim 1, wherein the at least one processor is configured to generate the avatar according to the attribute information relating to each worker.

5. The production management system according to claim 1, wherein the task is a task performed on the production line.

6. A non-transitory computer-readable medium storing a program that, when executed by at least one processor of a computer system, causes the at least one processor to perform the processes of the production management system according to claim 1.

7. The production management system according to claim 1, wherein the attribute information includes at least one of a physical handicap, an age, presence or absence of concurrent duties with other tasks, years of employment, a job title, a qualification, a height, a weight, a gender, a physical ability, and a disability.

8. The production management system according to claim 7, wherein the environmental information relating to the work location of each worker includes at least one of whether a task location of the task is near a phone, whether the task location is near a parts arrival location, whether the task is likely to be a task with a defective product or an inferior product, whether operation of a machine separately from the task is necessary, whether the task is responsible for a recovery operation for machine failures and errors, whether a device to be used is excellent in an operability, and whether a workability and a work efficiency corresponding to a product are good.

9. A production management method executed by a computer system including at least one processor and a memory, the method comprising:

receiving, based on information acquired from a sensor that detects a deliverable indicating completion of a task performed by each worker among a plurality of workers arranged along a production line, a completion of the task;

counting a completion number of the task performed by each worker;

acquiring, from the memory, attribute information relating to each worker and environmental information relating to a work location of each worker, and generating a coefficient for each worker based on the attribute information and the environmental information;

obtaining an acquisition point for each worker by multiplying the counted completion number of the task performed by each worker and the coefficient for each worker; and generating, and outputting to a single display device viewable by a manager of the plurality of workers arranged along the production line, a graphical user interface of the plurality of workers arranged along the production line in which respective avatars corresponding to the plurality of workers are simultaneously arranged in an arrangement that spatially corresponds to positions of the plurality of workers along the production line, each of the avatars being dynamically updated in real time as the counting incrementally counts the completion number of the task and as the acquisition point for each worker changes, wherein the generating and outputting includes applying to each of the avatars simultaneously displayed in the graphical user interface of the plurality of workers arranged along the production line a special visual effect or decoration based on a relative comparison of the acquisition points among the plurality of workers, and the graphical user interface of the plurality of workers arranged along the production line provides an operational status of the production line as a whole including a current progress and a relative performance state of each of the plurality of workers arranged along the production line.

* * * * *